(No Model.)
J. E. PEARCE.
PRIMARY VOLTAIC BATTERY.
No. 356,261. Patented Jan. 18, 1887.
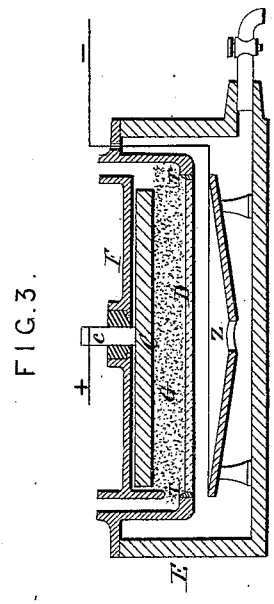
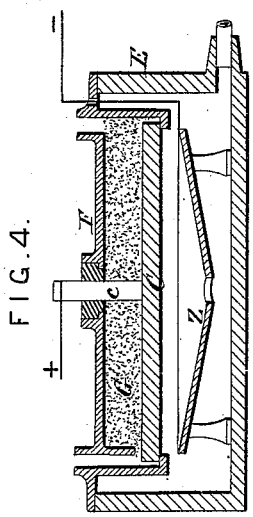
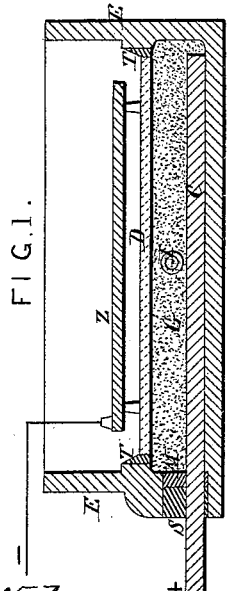
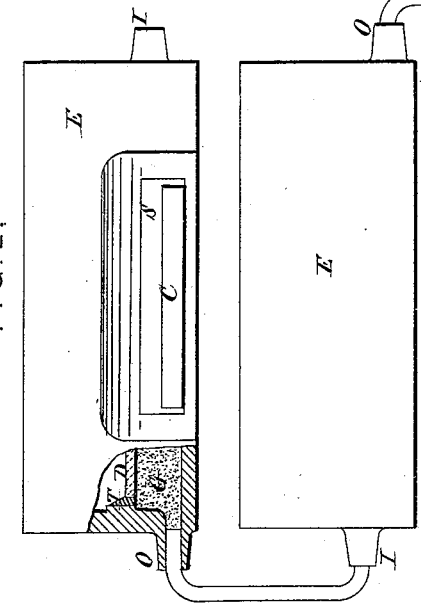
Witnesses:
Geo. W. Rea
Robert Everett
Inventor,
James E. Pearce,
By James L. Norris
Atty.
N. PETERS, Photo-Lithographer, Washington, D. C.

UNITED STATES PATENT OFFICE.

JAMES EDWARD PEARCE, OF MAIDENHEAD, COUNTY OF BERKS, ENGLAND.

PRIMARY VOLTAIC BATTERY.

SPECIFICATION forming part of Letters Patent No. 356,261, dated January 18, 1887.

Application filed August 19, 1886. Serial No. 211,303. (No model.) Patented in England May 28, 1886, No. 7,189.

*To all whom it may concern:*

Be it known that I, JAMES EDWARD PEARCE, a citizen of England, residing at Maidenhead, in the county of Berks, England, have invented a new and useful Primary Voltaic Battery, (for which I have applied for a patent in Great Britain, dated May 28, 1886, No. 7,189,) of which the following is a specification.

My invention relates to a construction of primary voltaic battery, which I will describe, referring to the accompanying drawings.

Figure 1 is a transverse section of one cell, and Fig. 2 is an elevation, partly in section, of the lowest two cells of a number that may be superposed. Figs. 3 and 4 are sections showing modified arrangements of the cell.

E is a trough-like vessel, which may be of glass, earthenware, vulcanite, or other imperfectly conducting material. On the bottom is bedded in any cement—such as marine glue, which is not attacked by chlorine—a slab, C, of carbon, to which is connected the $+$ terminal of the cell. On the slab C is packed a quantity of granular carbon, G, which is moistened with a solution of zinc chloride. Above this is fixed a porous slab, D, which may be of ceramic material, such as is used for the porous pots of voltaic batteries. At a little height above D is supported a slab, Z, of zinc, to which is connected the $-$ terminal of the cell. In putting together the parts of the cell, the space above the carbon slab C having been filled in with granular carbon G, the porous slab D is placed upon it, and its junction to the vessel made good by plaster-of-paris at T. When this is firmly set, additional granular carbon is introduced under D, and the whole is tightly packed. The side aperture through which the carbon C projects is then closed by marine glue or equivalent cement, M, and plaster-of-paris, S. The granular carbon is then moistened with solution of zinc chloride, which may be introduced by the opening I or O. The cell is then charged with a solution of chloride of zinc, some of which, oozing through the porous slab D, keeps the granular carbon G moistened. Chlorine gas is admitted by an inlet, I, to the granular carbon, and passes out by the outlet O. When a number of cells are superposed, the outlet O of the one is connected by a pipe of glass, or it might be lead, to the inlet of the next lower cell, and the outlet of the lowest cell is connected to a vessel, V, in which is collected such of the liquid as may accompany the gas, while the gas itself may be allowed to escape by a pipe, P, or may be led to a vessel containing lime, so as to produce chloride of lime.

The carbon C may be placed uppermost, as shown in section at Fig. 3, the zinc Z being supported in the lower part of the cell. In this construction the cell consists of the outer vessel, E, and a lid, F, the sides of which project down into the liquid and carry the porous slab D. The zinc Z is preferably hollowed into dish form, with an opening through it, so that the denser portions of the solution may flow down to the bottom.

By employing a porous or perforated carbon slab the porous slab D may be dispensed with, the cell then being arranged as shown in Fig. 4, where C is the slab of porous or perforated carbon, on which the granular carbon G is packed through an opening at the top. A stem, $c$, of carbon projects up from the slab C, and after packing in the granular carbon G the opening around $c$ is made good with marine glue or equivalent cement.

I have mentioned zinc as the metal, solution of zinc chloride as the liquid to be used, and chlorine as the gas, which in that case is passed through the granular carbon. The action of the cell might nevertheless be carried on with another metal and another liquid, such as a solution of its sulphite, sulphurous acid being then used as the gas.

I am aware that a single-liquid voltaic battery has been constructed in which a solution of chlorhydric acid and water is the exciting-fluid, carbon and zinc plates the electrodes, and chlorine gas is used for producing depolarization or maintaining the fluid at the required strength. Such form of battery is not embraced within the scope of my invention.

Having thus described the nature of my invention and the best means I know of carrying the same out in practice, I claim—

1. A primary voltaic battery consisting of a vessel or jar, horizontal slabs of porous carbon and metal constituting the electrodes, a packing of granular carbon, a liquid solution of a compound of the metal electrode, and free chlorine gas circulating through the granular carbon during the entire working of the battery, substantially as herein set forth.

2. A primary voltaic battery comprising a vessel or jar, the horizontal solid carbon electrode projecting through a liquid-tight joint in its vertical wall, the mass of granular carbon resting on said solid carbon electrode, the horizontal porous diaphragm or partition, the horizontal metal electrode arranged above said partition, a liquid solution of a compound of the metal electrode, and means for passing a gas through the mass of granular carbon, substantially as herein set forth.

In testimony whereof I have signed my name to this specification, in the presence of two subscribing witnesses, this 13th day of July, A. D. 1886.

JAMES EDWARD PEARCE.

Witnesses:
   OLIVER IMRAY,
*Patent Agent, 28 Southampton Buildings, London, W. C.*
   JNO. P. M. MILLARD,
*Clerk to Abel & Imray, Consulting Engineers and Patent Agents, 28 Southampton Buildings, London, W. C.*